(12) United States Patent
Yang et al.

(10) Patent No.: US 10,591,387 B2
(45) Date of Patent: Mar. 17, 2020

(54) SIGNAL CLASSIFICATION

(71) Applicant: Ford Global Technologies, LLC, Dearborn, MI (US)

(72) Inventors: Hao Howard Yang, Ann Arbor, MI (US); Qun Xu, Livonia, MI (US); Barth Rex Dalrymple, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 818 days.

(21) Appl. No.: 13/973,119

(22) Filed: Aug. 22, 2013

(65) Prior Publication Data

US 2015/0057976 A1 Feb. 26, 2015

(51) Int. Cl.
*G01M 17/007* (2006.01)
*B60L 3/00* (2019.01)
*G06F 17/00* (2019.01)

(52) U.S. Cl.
CPC ......... *G01M 17/007* (2013.01); *B60L 3/0023* (2013.01); *G06F 17/00* (2013.01)

(58) Field of Classification Search
CPC .................................................. G06Q 10/06
USPC ... 702/5, 130, 136, 141, 150, 176, 177, 179, 702/183, 189; 348/143; 375/259; 709/224
See application file for complete search history.

(56) References Cited

U.S. PATENT DOCUMENTS

| | | | |
|---|---|---|---|
| 4,796,206 A | 1/1989 | Boscove et al. | |
| 5,237,504 A * | 8/1993 | Holmes | G01M 15/11 701/102 |
| 7,378,953 B2 * | 5/2008 | Coronel | G01D 21/00 340/539.1 |
| 8,774,094 B2 * | 7/2014 | Chen | H04W 4/006 370/231 |
| 2001/0001616 A1 * | 5/2001 | Rakib | H03M 13/256 375/259 |
| 2004/0036296 A1 * | 2/2004 | Blackburn | F02N 11/04 290/48 |
| 2004/0054776 A1 * | 3/2004 | Klotz | H04L 41/06 709/224 |
| 2006/0030981 A1 | 2/2006 | Robb et al. | |
| 2006/0036361 A1 * | 2/2006 | Romer | B60K 28/16 701/84 |
| 2007/0288414 A1 * | 12/2007 | Barajas | G06N 7/00 706/46 |
| 2009/0312038 A1 * | 12/2009 | Gildea | G01S 19/52 455/456.4 |
| 2010/0085054 A1 * | 4/2010 | Nielsen | G01V 3/38 324/326 |

(Continued)

*Primary Examiner* — Paul D Lee
(74) *Attorney, Agent, or Firm* — Brandon Hicks; Bejin Bieneman PLC (57) ABSTRACT

A computing device receives a first digital signal from a data acquisition system. It is determined that a first value includes in the first signal indicates an event. A second digital signal is received from the data acquisition system. It is determined that a second value included in the second signal includes a value that indicates the event, and that the event has occurred based at least in part on the first value, the second value, and a passage of a predetermined duration of time between a time of the first digital signal and a time of the second digital signal.

9 Claims, 8 Drawing Sheets

(56) References Cited

U.S. PATENT DOCUMENTS

| | | | |
|---|---|---|---|
| 2010/0085216 A1* | 4/2010 | Ms | G06F 3/043 341/20 |
| 2010/0088031 A1* | 4/2010 | Nielsen | G06Q 10/06 702/5 |
| 2010/0292890 A1 | 11/2010 | Morris | |
| 2011/0018998 A1* | 1/2011 | Guzik | H04N 21/21 348/143 |
| 2012/0277949 A1 | 11/2012 | Ghimire et al. | |
| 2013/0013138 A1* | 1/2013 | Lu | B60L 3/0061 701/22 |
| 2014/0039740 A1* | 2/2014 | Kwon | G06F 17/00 701/22 |
| 2015/0006446 A1* | 1/2015 | Chiba | A61B 5/1123 706/12 |

* cited by examiner

SIGNAL CLASSIFICATION

BACKGROUND

Physically testing products such as vehicles is a key part of the product development quality assurance process. Robots can be used for product testing. For example, when testing vehicles, robots may be used to operate a vehicle and may provide greater consistency than human drivers in repeatedly following a predefined driving path and/or in meeting other test parameters such as maintaining vehicle speeds, acceleration, etc. Robots also may relieve humans from monotonous and/or hazardous testing conditions. However, robots suffer from the drawback of not being able to detect potential problems in a test prototype that may arise during product testing.

For example, in addition to piloting a test vehicle, a test driver also has an important responsibility to detect mechanical anomalies in a vehicle. In fact, it is better if a product tester such as a vehicle driver detects mechanical issues in early rather than later stages of mechanical failure to prevent unnecessary secondary damage to a prototype, e.g., prototype vehicle, that may be expensive and or of limited availability. The inability of existing test systems to provide for early detection of prototype malfunctions and failures has been an impediment to using automated test technologies such as automated driving technology in product testing, such as vehicle durability testing.

DETAILED DESCRIPTION

System Overview

Figure 1:
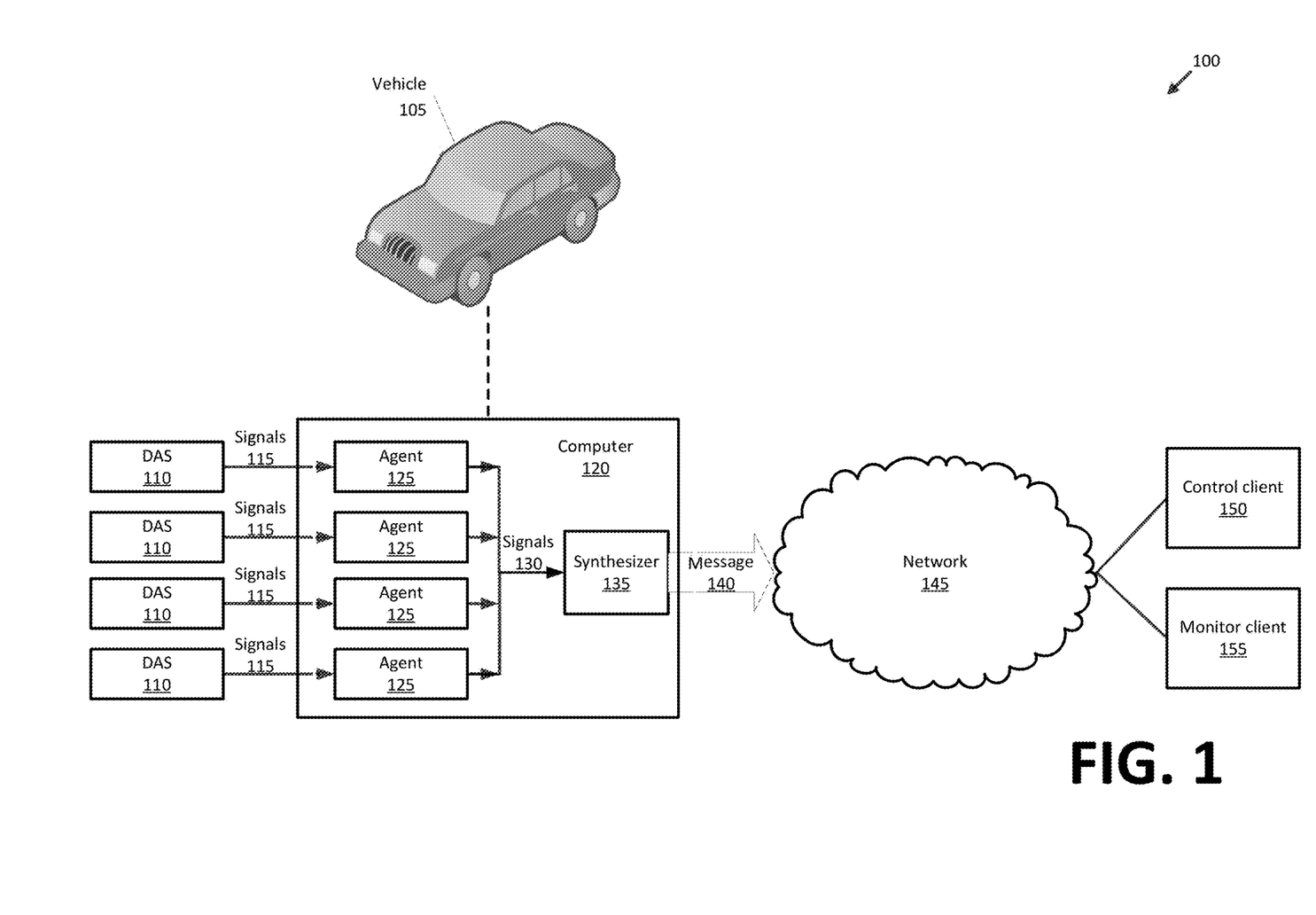
FIG. 1 a block diagram of an exemplary signal classification system.

FIG. 1 is a block diagram of an exemplary signal classification system 100. A product such as a prototype vehicle 105 may include one or more data acquisition systems (DAS) 110 that provide raw signals 115 to a computing device 120. One or more agent modules 125 may be included in a memory of the computing device 120, including instructions executable by a processor thereof, each of the agents 125 corresponding respectively to the one or more DAS's 110. Each agent 125 processes signals 115 received from the DAS 110 corresponding to the agent 125, and selectively provides one or more processed signals 130 to a synthesizer module 135 that is also generally included in the computer 120, i.e., including instructions executable by a computer 120 processor stored in a memory of the computer 120. The synthesizer 135 analyzes one or more messages 140 from the agents 125, e.g., using a rule-based analysis or the like, and provides a message 140, generally via a network 145, to a control client 150. A monitor client 155 may also receive messages 140 via the network 145.

Exemplary System Elements

The vehicle 105 may be any type of prototype test vehicle. Further, the vehicle 105 is discussed herein as an example of a prototype product. It is to be understood that, in addition to vehicles such as automobiles, trucks, airplanes, boats, motorcycles, etc., the systems and methods disclosed and/or claimed herein could be implemented with respect to many other types of prototype product, e.g., factory machines, home appliances, etc.

A data acquisition system (DAS) 110 may be any one of a number of devices that obtain raw data from one or more elements of a product such as the prototype vehicle 105. Generally, the DAS 110 measures a raw analog attribute of the vehicle 105 or a portion or component thereof, e.g., a voltage, a pressure, a speed, acceleration, deceleration, etc., and converts the measurement to a digital signal 115 that the DAS 110 and provides to the computer 120, e.g., to an agent 125. Examples of a DAS 110 include an accelerometer that may be used to provide information about vibrations in the vehicle 105, sound pressure sensors or microphones that may be used to measure sound pressure, a temperature sensor that may be placed at one or more locations in the vehicle 105, a tire pressure sensor, voltage and/or current sensors that may provide measurements from one or more locations in a vehicle 105 electrical system, etc. In addition, a DAS 110 may represent one or more secondary data sources, e.g., signals 115 may be available from a pre-existing communications infrastructure in the vehicle 105, or provided to an agent 125 via some source external to the vehicle 105, e.g., an external sensor. For example, signals 115 available from a controller area network (CAN) communications bus in a vehicle may be provided to an agent 125.

A signal 115, as mentioned above, is generally provided by a DAS 110 to an agent 125 in a digital format. For example, a vehicle 105 sensor or the like may be configured to periodically provide a data value, e.g., a measurement from an accelerometer or sound pressure sensor, to a respective agent 125. Thus, the DAS 110 generally performs a conversion of analog data to digital data in a conventional manner before providing a signal 115 to the agent 125. For example, a signal 115 provided to a vibration agent 125 may include time series data received from A/D converters of an accelerometer DAS 110.

In general, signals 115 may include two kinds of data that may be identified by an agent 125, the first such kind of data being referred to as "events," the second being referred to as "statuses."

An "event" is a signal that appears at a particular time for a particular duration of time. Examples of events are: a vibration pulse, a loud bang of noise, and an application of a brake. An event has what may be referred to as a transient property: the event may or may not appear at a particular time interval. That is, in a continuous or substantially continuous stream of signals 115 from a DAS 110, events may come and go. An event therefore has attributes of a start time and an end time. Events are identified by the agent 125 to provide information, e.g., in the form of processed signals 130 to the synthesizer 135 that may be useful in identifying potential problems such as malfunctions in a vehicle 105. For example, if vehicle 105 vibration and noise exceed a predetermined level concurrently, the noise might be related to the vibration. Likewise, if a surge of vehicle 105 engine speed is not coincident with transmission gear shifting or pushing of the gas paddle, the surge of engine speed is more likely indicative of a malfunction of the vehicle 105 engine or drive system. Accordingly, an agent 125 may analyze signals 115 to identify an event that may be provided in a processed signal 130 to the synthesizer 135.

A "status" is an operating condition applicable to a product such as a prototype vehicle 105. Examples of a status are engine on/off status, a transmission gear position, etc. A status has what may be referred to as a persistence property: a status always has a value. A status also has what may be referred to as a uniqueness property: it generally has a single value. For example, at a given time, a washing machine may have "rinse" status.

Figure 2:
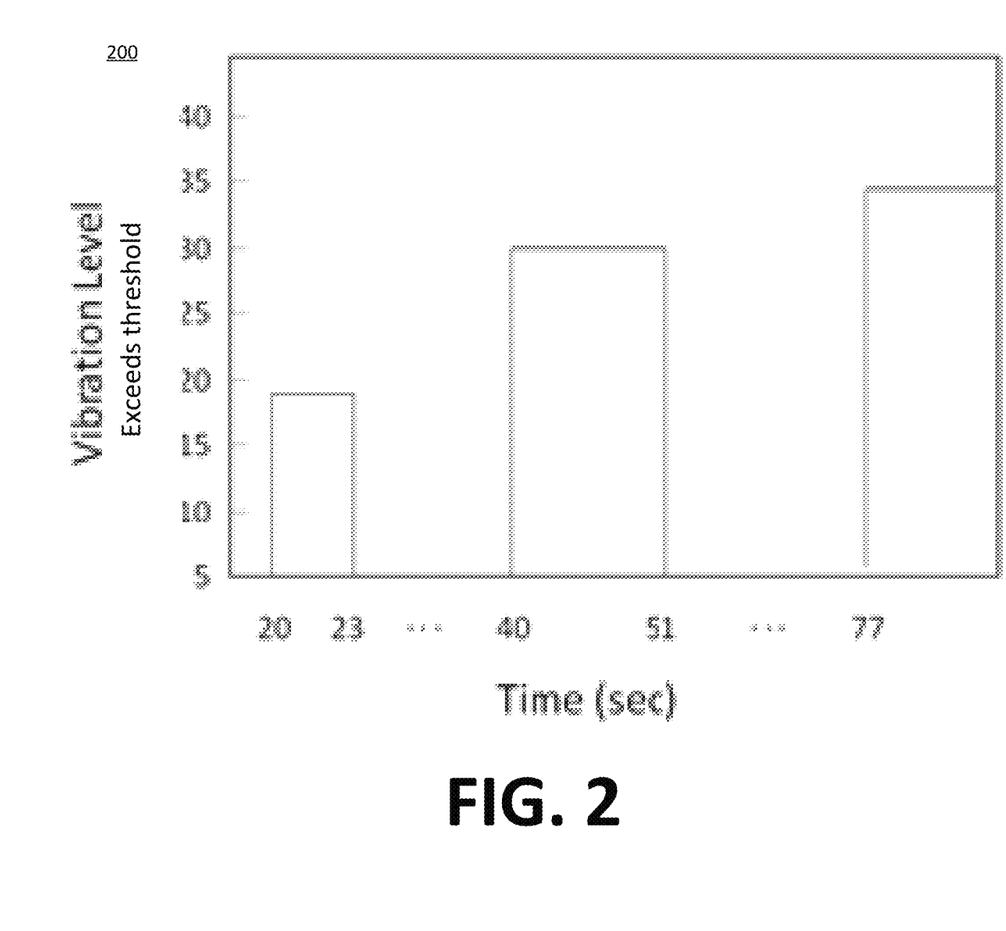
FIG. 2 illustrates an exemplary graph of vibration signal events.

FIG. 2 illustrates an exemplary graph 200 of vibration signal 115 events relating to a particular location in a vehicle 105 (e.g., a right-front location on a vehicle 105 chassis), such as might be included in a fact stack of the synthesizer 135. As mentioned above, events may be transient. Thus, the X axis of the graph 200 shows that signals 115 have indicated vibration events at certain points in time. That is, the graph 200 includes three events that have been detected by the agent 125: the respective durations of the three events being from seconds 20 to 23, from seconds 40 to 51, and from second 77 to a current time. These events have been pushed into the fact stack of the synthesizer 135 (but are generally subject to purge rules so that an unduly large number of unnecessary past facts is not maintained). The y-axis of the graph 200 provides an indication of a magnitude value of a vibration level exceeded a predetermined threshold during an indicated period of time.

Figure 3:
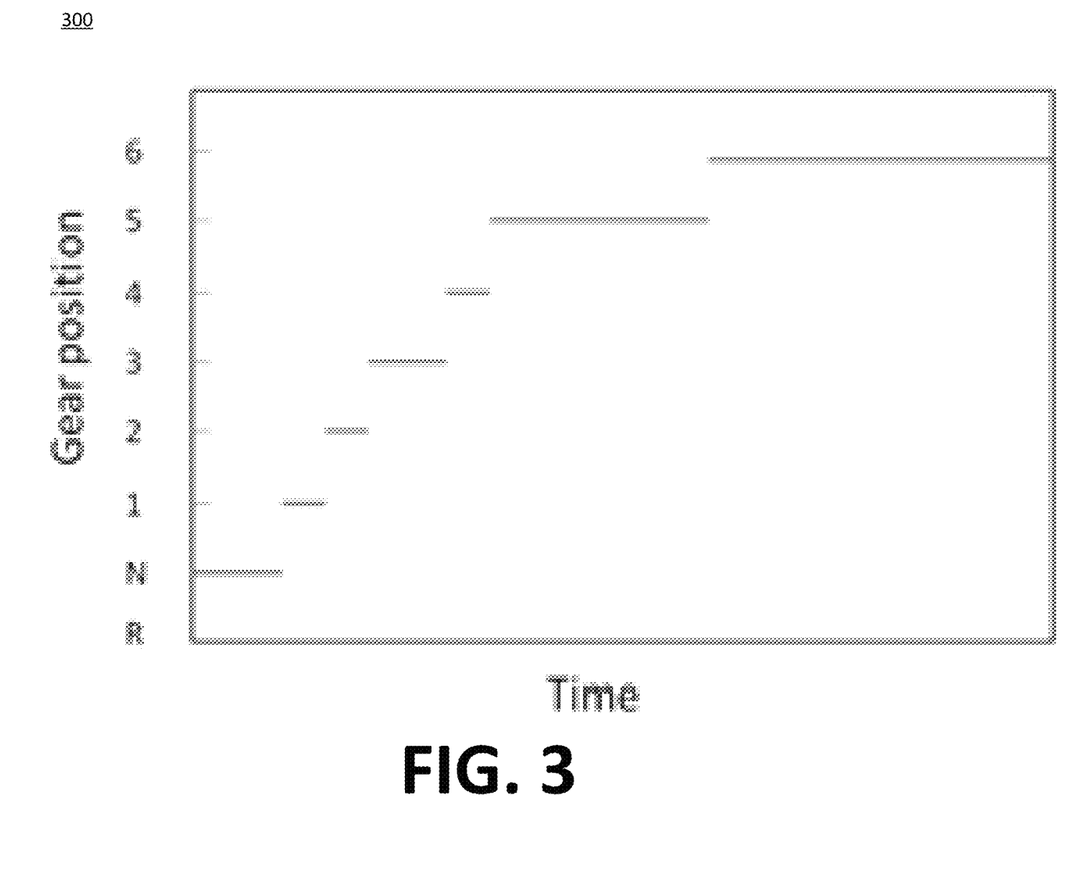
FIG. 3 illustrates an exemplary graph of transmission position statuses.

FIG. 3 illustrates an exemplary graph 300 of transmission signal 115 statuses, such as might be included in a fact stack of the synthesizer 135. Accordingly the x-axis of the graph 300 shows transmission signal 115 statuses as a function of time, and the y-axis of the graph 300 shows different transmission positions. As stated above, the existence of a status is generally not time-dependent, i.e., a status relates to a vehicle 105 property that generally continuously exists, and at any given moment in time a value for the status may be determined, as opposed to an event that is generally measured over a period of time. Although signals 115 generally indicate a time when a status value changes, this time attribute of a status is generally not important to the synthesizer 135 because its rules generally use a current status value without respect to the status duration. That is, there is only one fact in the fact stack of the synthesizer 135 for each status. Generally, when the fact stack is instantiated, statuses are set to default values. Then, when a status changes its value, the new status value replaces the old one. However, a time when a status changes to a particular value, e.g., as shown in the graph 300, is relevant for the fact stack of the synthesizer 135 so that statuses indicated by a signal 130 may be correlated to events indicated by signals 130.

The computer 120 is generally installed in the vehicle 105. However, especially in the case where a product being tested was other than a vehicle 105, the computer 120 could be remote to, and in wired or wireless communication with, data acquisition systems 110. For example, the computer 120 may be a mobile or portable computing device such as a laptop computer, tablet computer, an onboard processor, etc. In general, the computer 120 includes a processor and a memory for executing instructions such as described herein, e.g., instructions of agents 125 and/or the synthesizer 135.

Each agent 125 generally includes instructions for processing signals 115 from a particular DAS 110. In general, the goal of an agent 125 is to supply an artificial intelligence system with processed data, such as events, statuses, and the like from signals 115 provided by the DAS 110. For example, abnormal sound and vibration levels may suggest possible mechanical failures in the vehicle 105; agents 125 processing sound and vibration signals 115, as well as many other kinds of signals 115, may be configured to provide processed signals 130 to the synthesizer 135 that may suggest such mechanical failures. Thus, sound and vibration signals 115 may be acquired by putting microphone DAS's 110 in a vehicle 105 cabin and by mounting acceleration sensor DAS's 110 on the vehicle 105 frame. Further for example, a brake agent 125 may receive a brake signal 115 indicating whether a vehicle 105 brake is engaged or disengaged.

In general, properties of agents 125 include the following:

Autonomy: each agent 125 acts independently from any other agent 125. The processing of each agent 125 is limited to the raw signals 115 from the specific DAS 110 corresponding to the agent 125. Consequently and advantageously, an agent 125 does not need to be managed by the inference engine of the synthesizer 135, discussed further below.

Persistence: each agent 125 monitors raw signals 115 continuously or substantially continuously, and only outputs signals 130 according to certain circumstances. This property of agents 125 advantageously frees the inference engine of the synthesizer 135 from the burden of continuous or substantially continuous raw signal 115 processing and monitoring.

Ignorance: an agent 125 does not receive any information concerning, or consider, how the processed signals 130 from the agent 125 may be used or may affect a rule's firing in the synthesizer 135.

Processed signals 130 provide aggregations, analyses, and/or attributes of signals 115 determined by the agent 125. For example, outputs of a sound agent 125 generally include the noise levels, analyzed to provide peak and/or RMS (Root Mean Square) values. A processed signal 130 can also include attribute information such as the frequency and duration of the signal 115. To take another example, an output of a brake agent 125 may simply be a binary indication concerning whether a brake is engaged or disengaged, whereupon a processed signal 130 could simply include a 1 or 0 or the like. Processed signals 130 may be provided to the synthesizer 135 in a variety of formats. For example, in one implementation, a processed signal 130 is provided to the synthesizer 135 as a string of text data.

Figure 4A:
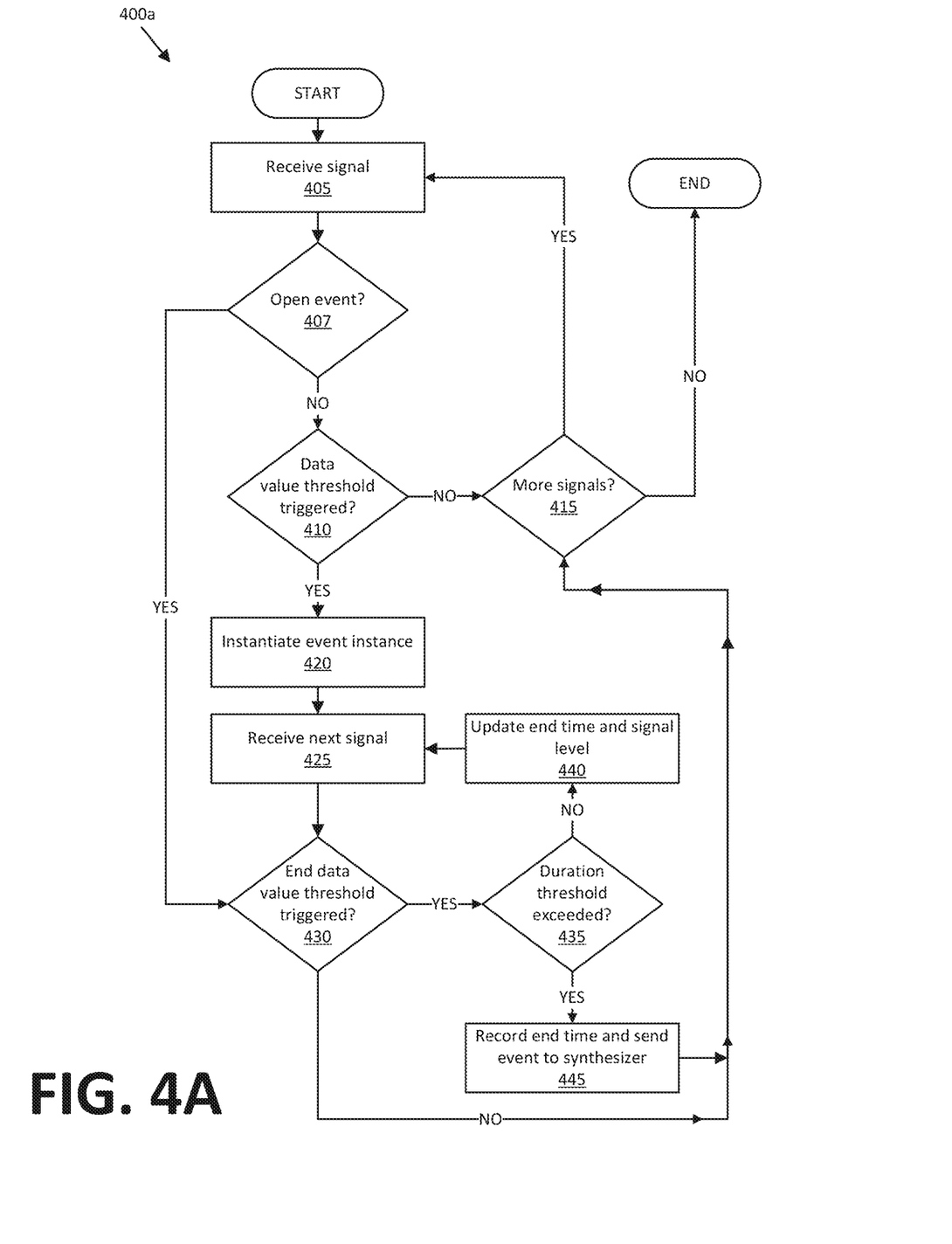
FIG. 4A is a diagram of a first exemplary process for an agent to identify an event.
Figure 4B:
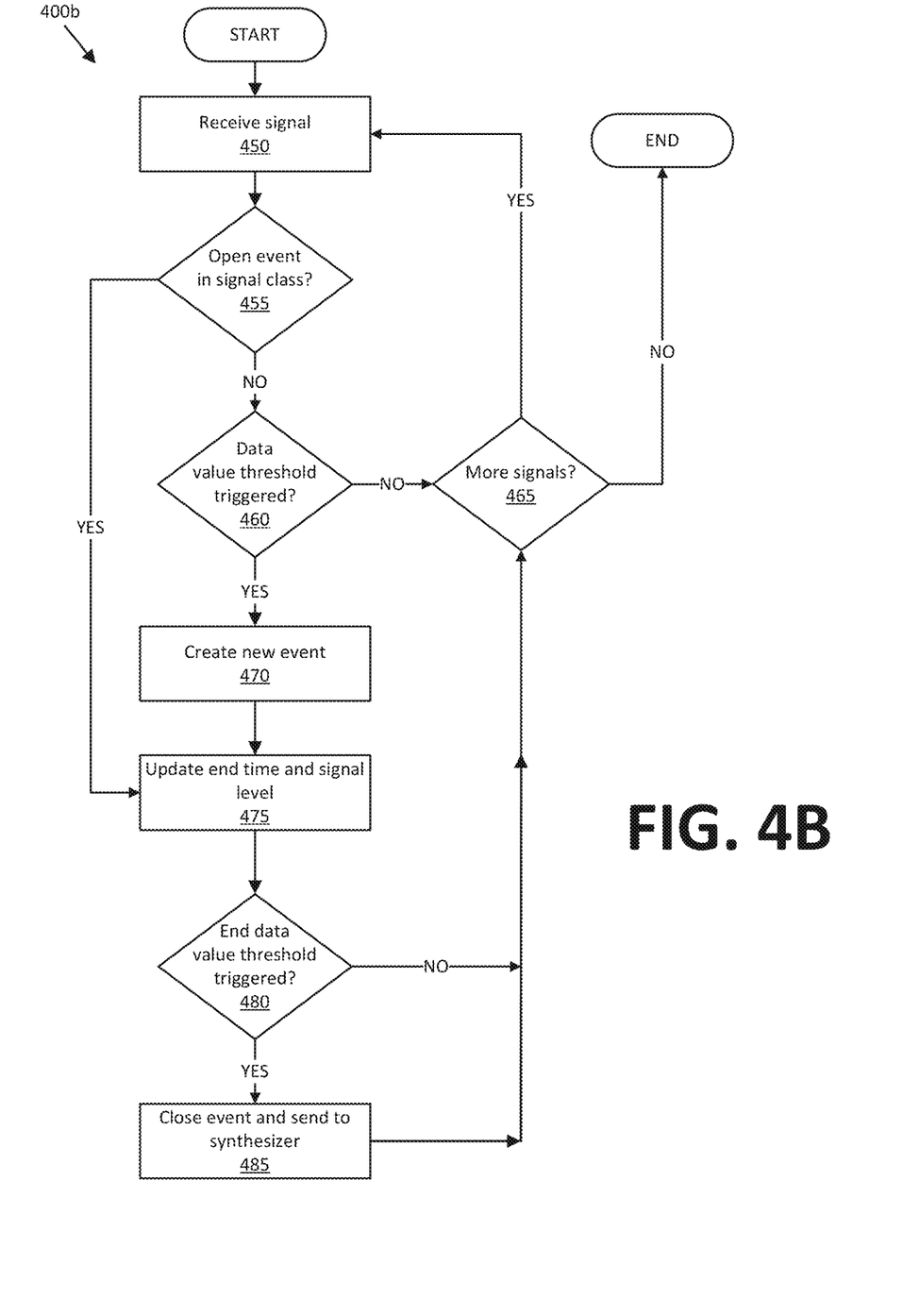
FIG. 4B is a diagram of a second exemplary process for an agent to identify an event.
Figure 5:
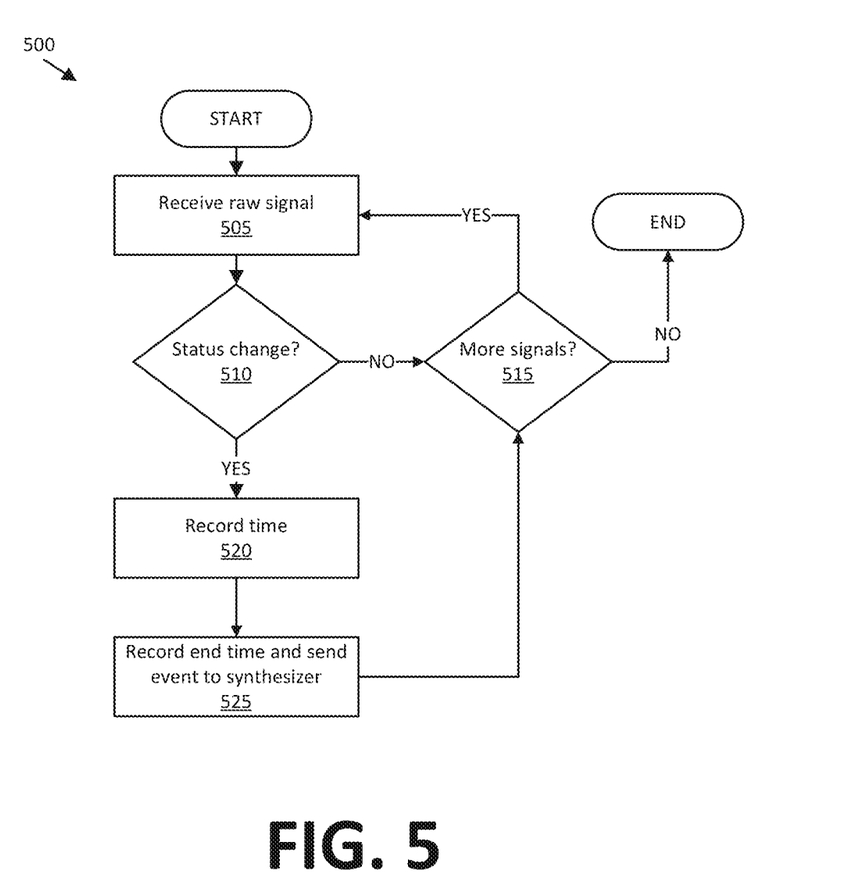
FIG. 5 is a diagram of an exemplary process for an agent to identify a status.

FIGS. 4A, 4B, and 5, discussed below, illustrate exemplary processes by which an agent 125 can identify an event and status, respectively, to be included in a processed signal 130. An event may be identified by a data value persisting for a predetermined period of time. In general, an event starts when a key character attribute occurs, or a key character attribute exceeds a certain value, called a threshold. This event ends when a key character attribute disappears, or a key character attribute falls below a certain value, i.e., a threshold. This key character attribute is called triggering attribute. The start and end triggering attributes may be, but do not have to be, the same attribute. For example, in one implementation, the start of a brake event is identified when a signal 115 is received indicating that a brake pedal has been pushed. The end of this brake event is identified when a signal 115 is received by the agent 125 indicating that the vehicle 105 speed is close to zero.

Multiple attributes can be captured in an event. In the brake example, a distance that the vehicle 105 travels through the start and end of the event is one of the attributes that may be captured with this event. To take an example from another implementation, subject matter experts familiar with various aspects of vehicle 105 testing, and using data from historical tests, identified thresholds of for a vibration signal 115. The attributes captured for the vibration event then included the peak value and RMS (root mean square) of an acceleration signal 115.

The synthesizer 135 receives processed signals 130. In general, the synthesizer 135 is a rule-based system that maintains a fact stack. Thus, the synthesizer 135 includes rules acting upon asserted facts, e.g., statuses and/or events included in processed signals 130. For example, in the exemplary implementation discussed above, the subject matter experts likewise defined rules to be applied to events to determine whether a message 140 should be triggered when the RMS value of the vibration signal exceeds a certain value.

A message 140 includes information, e.g., in a textual format, extensible markup language (XML) or some other format, etc., provided by the synthesizer 135 relating to conditions, e.g., possible abnormalities, in a product such as the vehicle 105. For example, a message 140 could include a code or identifier for a condition and/or a textual description of the condition, e.g., "smoke/fuel fumes detected in cabin," "engine vibration exceeds recommended thresholds," "abnormal vertical shock in vehicle suspension at location front left" "abnormal vehicle body vibration, at location rear left," etc. In addition, the message 140 could include values associated with a condition, e.g., noise levels, peak and/or root mean square values relating to vibrations, etc.

The network 145 represents one or more mechanisms for providing messages 140 from the computer 120 to the clients 150 and/or 155. Accordingly, the network 145 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services. In one exemplary implementation, the network 145 is implemented as a "Wi-Fi" network according to IEEE 802.11.

The control client 150 may be a general-purpose computing device including a processor and a memory, such as a desktop computer, laptop computer, or an onboard computer, etc. In general, the control client 150 may include computer-executable instructions for displaying information received from a vehicle 105, including messages 140. For example, the control client 150 may include an application that establishes communications via the network 145 with the vehicle computer 120. This application may be configured to receive and parse messages 140, and to display content such as described above with respect to messages 140 in a graphical user interface or the like provided on the control client 150.

Further, the control client 150 may include a software application configured to communicate with devices in a vehicle 105 other than the vehicle computer 120, e.g., a control system for an automated driving application or the like. Accordingly, an operator of the control client 150, upon receiving one or more messages 140 indicating a likely problem in the vehicle 105, may transmit instructions to a vehicle 105 to cease a test. Alternatively or additionally, a software application in the control client 150 could be configured to automatically transmit such instructions to the vehicle 105 upon receipt of messages 140 including certain trouble codes or the like, or associating data values above certain thresholds with certain trouble codes, etc.

The monitor client 155 is likewise typically a general-purpose computing device including a processor and a memory, e.g., a tablet computer, laptop computer, smart phone, etc. The monitor client 155 is generally configured to allow for monitoring of messages 140 via the network 145, e.g., a company intranet, the Internet, etc. In one implementation, the monitor client 155 includes a conventional web browser; the control client 150 or some other computing device may include a Web server that provides content from messages 140 for display in the web browser on the client 155.

Exemplary Process Flows

FIG. 4A is a diagram of an exemplary process 400a for an agent 125 to identify an event. The process 400a assumes that the agent 125 is configured to process signals relating to a particular class of events. In other words, the process 400a may be executed in an agent 125 configured to receive signals 115 from a DAS 110 that may detect events, e.g., a vibration sensor, a noise sensor, a heat sensor, etc.

The process 400a begins in a block 405, in which the agent 125 receives a raw signal 115 from the DAS 110. As mentioned above, signals 115 may be provided to the computer 120 hosting the agent 125 via a variety of mechanisms, e.g., wired or wireless connections, a vehicle 105 CAN bus, etc.

Next, in a block 407, the agent 125 determines whether an event has been opened related to the raw signal 115, i.e., whether an event that could be indicated by a class or type of signal 115 received in the block 405 has been opened and is being tracked by the agent 125. If no event related to the signal 115 is open, then the process 400a proceeds to the block 410. However, if an event is open related to the signal 115, then the process 400a proceeds to a block 430.

In a block 410, which may follow the block 407, the agent 125 determines whether the triggering signal 115 received in the block 405 passes a predetermined threshold (which may be referred to as a "triggering attribute"). For example, a signal 115 could indicate that a noise or vibration threshold was exceeded, a speed indicator exceeds a predetermined threshold, or a switching signal turns on, etc. If a data value threshold is not triggered in the block 410, then a block 415 is executed next. However, if a data value threshold is triggered, then it is possible that the signal 115 will be associated with an event, and a block 420 is executed next. Note that, for some events, the triggering attribute is different from the signal 115 (e.g., vibration or noise) of interest. For example, continuing the example of the brake event in discussed above, the event triggering attribute is "brake-on." Recorded event attributes in this example, however, may include stop distance, noise, or other relevant attributes.

In the block 415, which may follow one of the blocks 410, 430, or 445, the agent 125 determines whether signals 115 are still being received from the DAS 110. If not, then the process 400a ends. If so, then the process 400a returns to the block 405.

In the block 420, which may follow the block 410, the agent 125 instantiates an event instance, and may record a start time, e.g., a time when a signal 115 was received, the start time to be associated with an event if the signal 115 in fact is indicative of an event. The agent 125 also initializes an event end time to be equal to the start time and further records signals 115 related to attributes defined relevant to an event (e.g., as discussed above, noise signals 115 could be recorded as relevant to a braking event).

Next, in a block 425, the agent 125 receives a next raw signal 115 from the DAS 110.

Next, in a block 430, the agent 125 determines whether the raw signal 115 received in the block 425 triggers a predetermined threshold or criteria to identify the end of an event, e.g., initialized as described regarding the block 420. For example, a criterion applied in the block 430 could be simply the same predetermined threshold discussed above with respect to the block 410. In general, various "end criteria" may be applied to determine the end of an event. For example, as just mentioned, a simple threshold that is the same value as the start triggering attribute could be applied. Further, an end triggering threshold could be higher or lower than the start triggering value. Alternatively or additionally, a predetermined time interval or a number count of a signal 115 could be applied as event end determining criteria. In any case, if the end of the event is identified, then a block 435 is executed next. Otherwise, the process 400a returns to the block 415.

Figure 7:
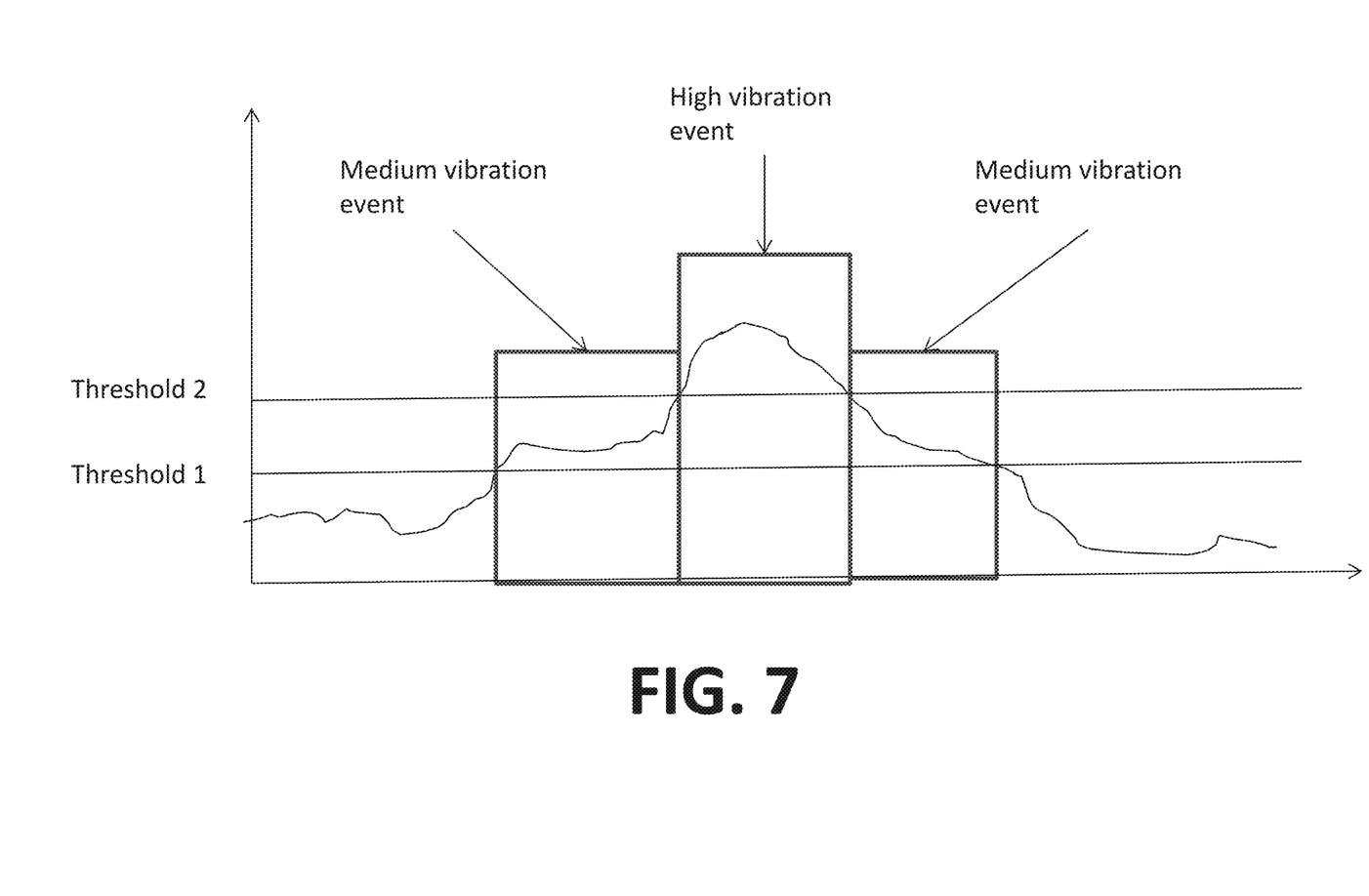
FIG. 7 illustrates an exemplary class of vibration events within a single event.

Note that, in some cases, the value of a signal 115 may change during an event, even while still triggering the predetermined threshold. For example, a vibration level that is recorded as an event attribute could vary. In general, the agent 125 implements logic for how to structure an event and how to count events. A changed event attribute value raises the question of whether to simply update the attribute value of the event or to create a new event. The answer to this question generally depends on an event class to which an event belongs. For example, as illustrated in FIG. 7, and referenced further below concerning a block 440, in a class of vibration events, a medium vibration event may be followed by a high vibration event, which in turn is then followed by another medium vibration event. A first signal 115 threshold is exceeded to trigger the first medium vibration event. When a second signal 115 threshold is exceeded, a new (high) vibration event is created and updated; the first medium vibration event is ended. When the signal 115 drops below the second threshold but remains above the first threshold, another medium vibration event is created and the high vibration event is ended.

In the block 435, the agent 125 determines whether an event duration threshold has been exceeded. That is, an event agent 125 generally includes instructions defining an event in terms of a data threshold, such as discussed above with respect to the block 410, and also a duration generally measured by time, but which could be measured in some other way, e.g., by a number of signals 115. For example, an event start may be triggered by a signal 115 that a certain switch in a vehicle 105 has been activated. An agent 125 then captures certain attributes of interests, values for which may be stored in an event object, e.g., that was instantiated as described above, within a predetermined period of time, e.g., 10 seconds, from the event start. In any case, if the event duration threshold has been exceeded, then an event may be defined, and the process 400a proceeds to a block 445. Otherwise, the process 400a proceeds to a block 440.

In the block 440, the agent 125 updates an event end time, e.g., stored in the event object instantiated as described above with respect to the block 420, and optionally (e.g., depending on whether an event belongs to a class or category of events that can have multiple, or multiple ranges of, signal 115 levels) updates a signal level attribute in the event object. In general, one or more signal levels within events themselves have attributes including, in addition to a signal 115 level or range of signal 115 levels, a start time and an end time. Following the block 440, the process 400a proceeds to the block 425.

In the block 445, the agent 125 updates an end time for the detected event and sends the event to the synthesizer 135 in a processed signal 130.

FIG. 4B is a diagram of an exemplary process 400b for an agent 125 to identify an event. The process 400b, in contrast to the process 400a of FIG. 4A, assumes that the agent 125 is configured to process signals relating to more than one class of events. In other words, the process 400a may be executed in an agent 125 configured to receive signals 115 from a DAS 110 that may detect multiple events related to multiple classes of events, e.g., the DAS 110 may be one or more of a vibration sensor, a noise sensor, a heat sensor, etc.

The process 400b begins in a block 450, in which, as in the block 405 described above, the agent 125 receives a raw signal 115 from the DAS 110.

Next, in a block 455, the agent 125 determines whether an event has been opened related to the raw signal 115, i.e., whether an event that could be indicated by a class or type of signal 115 received in the block 450 has been opened and is being tracked by the agent 125. The block 455 is similar to the block 407 described above; however, as already noted, in the process 400b, the agent 125 can process more than one class of event at a time, i.e., signals from different kinds of DAS's 110 at a time. In any case, if no event related to the signal 115 is open, i.e., regardless of whether the agent 125 has other open events, if no event in a class of events (e.g., vibration, noise, etc.) for the signal 115 is open, then the process 400b proceeds to the block 460. However, if an event is open related to the signal 115, then the process 400b proceeds to a block 475.

In a block 460, which is similar to the block 410 above and may follow the block 455, the agent 125 determines whether the triggering signal 115 received in the block 450 passes a predetermined threshold (which may be referred to as a "triggering attribute"). If a data value threshold is not triggered in the block 460, then a block 465 is executed next. However, if a data value threshold is triggered, then the signal 115 may be associated with an event, and a block 470 is executed next.

In the block 465, which may follow one of the blocks 460, 480, or 485, the agent 125 determines whether signals 115 are still being received from the DAS 110. For example, if a signal is not received from a DAS 115 within a predetermined period of time, the agent 125 may close all events, whereupon the process 400b ends. However, if signals 115 are being received, e.g., a signal 115 is received before a predetermined period of time has elapsed, then the process 400b returns to the block 450.

In the block 470, which may follow the block 460, the agent 125 creates a new event, e.g., instantiates an event instance, and may record a start time, e.g., a time when a signal 115 was received, the start time to be associated with an event if the signal 115 in fact is indicative of an event.

Next, in a block 475, which may follow the block 455 or the block 470, the agent 125 records, for the raw signal 115 received from the DAS 110, an event end time (equal to the start time if the block 475 is executed immediately following the block 470), and further records signals 115 related to attributes defined relevant to an event (e.g., as discussed above, noise signals 115 could be recorded as relevant to a braking event).

Next, in a block 480, the agent 125 determines whether the raw signal 115 received in the block 450 triggers a predetermined threshold or criteria to identify the end of an event and/or whether an event duration threshold has been exceeded, e.g., in a manner similar to the blocks 430 and/or 435 described above. In some cases, an event duration threshold may be defined, but a value from a raw signal 115 may be sufficient to define an end of an event; such logic may be appropriate where signals 115 to define an event are received more quickly than they can be processed by a data collector 110, and therefore a time between signals 115 may not be accurately measured. In any case, if the end of the event is identified, then a block 485 is executed next. Otherwise, the process 400b returns to the block 465.

Further in the block 480, in one implementation, the agent 125 sends the event to the synthesizer 135 in a processed signal 130. Thus, in this implementation the synthesizer 135 is aware of every event that has been opened, and every signal 115 recorded for each respective event, regardless as to whether the event has been closed as described with respect to the block 485. However, in a another implementation an event is only included in a processed signal 130 and sent to the synthesizer 135 once, e.g., when the event is closed, e.g., in the block 485.

In the block 485, the agent 125 closes the event. The process 400b then proceeds to the block 465.

FIG. 5 is a diagram of an exemplary process 500 for an agent 125 to identify a status. In other words, the process 500 may be executed in an agent 125 configured to receive signals 115 from a DAS 110 that may detect statuses, e.g., a signal 115 from a transmission controller indicating the gear position of the transmission, a signal from an engine controller indicating an on/off status, etc.

The process 500 begins in a block 505, in which the agent 125 receives a raw signal 115, identified as a status signal 115, from the DAS 110.

Next, in a block 510, the agent 125 determines whether a status change has been detected. As mentioned above, an agent 125 may be programmed to include a default status. Thus, in this block 510, the agent 125 may detect that the signal 115 is reporting a status different from a default status and/or different from a status of a previous signal 115. If a status change is not detected, then the process 500 proceeds to a block 515. However, if a status change is detected, then the process 500 proceeds to a block 520.

In the block 515, the agent 125 determines whether one or more further signals 115 are being received, i.e., whether the DAS 110 continues to provide signals 115. If not, then the process 500 ends. However, if signals 115 continue to be received, then the process 500 returns to the block 505.

In the block 520, which may follow the block 510, the agent 125 records a status change (or switch) time, i.e., a time of a status change. As noted above, statuses are generally not time-dependent. Thus, the block 520 may be omitted. However, there are instances in which noting a status switch time may be helpful. Accordingly, a time when a status change occurred may be noted in the block 520.

In the block 525, the agent 125 sends the status, including the time recorded as noted above, to the synthesizer 135 in a processed signal 130. Upon receipt of this processed signal 130, the synthesizer 135 notes the new value of the signal 130, and a status switch time, in the facts stack maintained by the synthesizer 135 (discussed further below with regard to FIG. 6). Following the block 525, the process 500 proceeds to the block 515.

Figure 6:
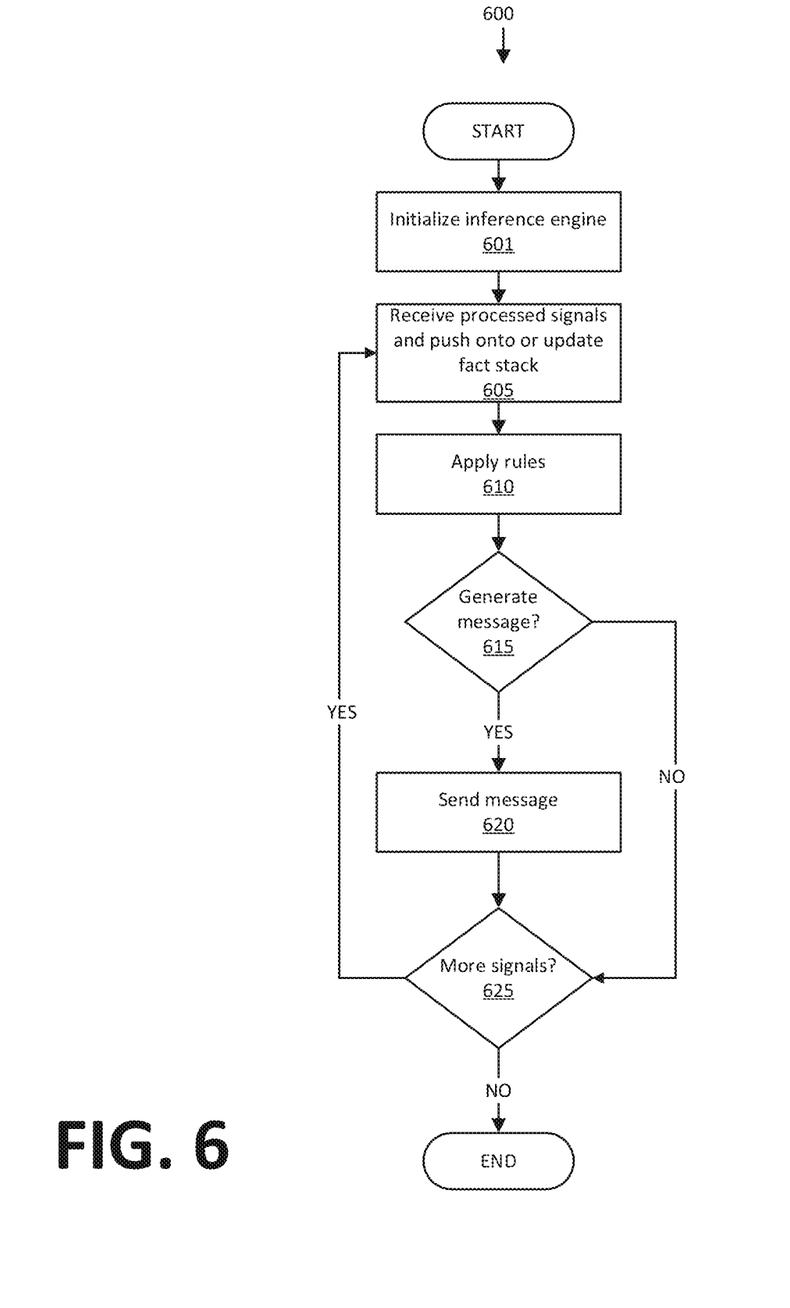
FIG. 6 is a diagram of an exemplary process for a synthesizer to generate a message.

FIG. 6 is a diagram of an exemplary process 600 for a synthesizer 135 to generate a message 140. In general, the synthesizer 135 includes a conventional inference engine and maintains a facts stack of asserted facts. The rules engine applies a set of rules to the facts.

The process 600 begins in a block 601, in which the inference engine instantiates a facts stack, which initially includes a set of statuses that are initialized to default values.

Next, in a block 605, one or more processed signals 130, which could include events as well as status, are received from one or more agents 125, and, in the case of events, are pushed on to the facts stack. (As mentioned above, events in the facts stack may be periodically purged to avoid overconsuming resources in the computer 120.) Where a signal 130 represents a status, the signal 130 is used to update a status value as appropriate in the inference engine's facts stack, as mentioned above.

Next, in a block 610, the inference engine included in the synthesizer 135 applies rules to the asserted facts. For example, rules could include determining whether a "brake status is on" correlates to an event to which no brake should be applied, e.g., vehicle 105 acceleration; or alternatively correlating the brake status "on" to an acceleration or deceleration exceeding a predetermined level for a given period of time, etc.

Next, in a block 615, the synthesizer 135 determines whether to generate a message 140, e.g., whether application of the rules engine to the facts stack indicates a condition that should be communicated to the control client 150 and/or monitor client 155. If not, the process 600 proceeds to a block 625. However, if a message 140 should be generated, then the process 600 proceeds to a block 620.

In the block 620, the synthesizer 135 sends the message 140 via the network 145, e.g., in a text format, extensible markup language (XML) format, etc., to the control client 150 and/or monitor client 155. As noted above, the message 140 could be provided to a web server or other computer server or the like and then displayed, e.g., to the clients 150, 155 in a standard web browser.

In a block 625, which may follow the block 615 or the block 620, the synthesizer 135 determines whether at least one signal 130 has been received to be processed. If so, the process 600 returns to the block 605. Otherwise, the process 600 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, LISP, prolog, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising;
   a plurality of mechanical components included in a physical machine;
   a communication bus included in the physical machine;
   a plurality of sensors included in the physical machine to provide digital signals, each of the sensors (i) disposed to obtain an analog signal measuring one or more of the mechanical components when the machine is in operation, (ii) configured to convert the obtained analog signal to one of the digital signals, and (iii) configured to output a converted digital signal to the communication bus,
   wherein the plurality of sensors includes a first sensor configured to output a first digital signal and a second sensor configured to output a second digital signal, the first digital signal including a first measurement of operation of one or more of the mechanical components at a first time, and the second digital including a second measurement of operation of the one or more mechanical components in the machine at a second time that is after the first time; and
   a first computer included in the physical machine, including a processor and a memory, the memory storing instructions executable by the processor such that the first computer is programmed to:
      receive the digital signals from the sensors via the communication bus;
      after determining that the first measurement meets a first threshold, then determine that the second measurement meets a second threshold;
      determine a time difference that is an amount of time passing between the first time and the second time; and
      upon determining that the time difference is greater than a predetermined amount of time, determine the occurrence of an event associated with the first and second measurements of operation of the one or more mechanical components in the machine;
   wherein the first data and the second data measure different data attributes.

2. The system of claim 1, further comprising:
   a wireless network, wherein the first computer is further programmed to provide messages via the wireless network; and
   a second computer physically separated from the physical machine and programmed to:
   receive messages, including data about the event, from the first computer via the wireless network; and
   control the physical machine based on one or more received messages from the first computer.

3. The system of claim 2, wherein controlling the physical machine includes ceasing operation of the physical machine.

4. The system of claim 1, wherein the first computer is further programmed to receive at least one third measurement between the first and second times.

5. The system of claim 1, wherein the first computer is further programmed to record the first time as the event start time and the second time as the event end time.

6. The system of claim 1, wherein the first computer is further programmed to provide event data to a fact stack of a rules engine.

7. The system of claim 1, wherein the first computer is further programmed to receive a third measurement from a second sensor, the third measurement including data indicating a status of one of the one or more mechanical components.

8. The system of claim 1, wherein the first and second thresholds are a same value.

9. The system of claim 1, wherein the machine is a vehicle.

* * * * *